US012748208B2

(12) United States Patent
Sivan et al.

(10) Patent No.: US 12,748,208 B2
(45) Date of Patent: Sep. 29, 2026

(54) COMMUNICATIONS TECHNOLOGY SELECTION MANAGEMENT AND MAPPING ALGORITHM

(71) Applicant: BLACK BOX VOICE LTD., Holon (IL)

(72) Inventors: Danny Sivan, Yavne (IL); Ezra Orkoby, Azor (IL)

(73) Assignee: BLACK BOX MEDICAL, Holon (IL)

( * ) Notice: Subject to any disclaimer, the term of this patent is extended or adjusted under 35 U.S.C. 154(b) by 65 days.

(21) Appl. No.: 18/034,895

(22) PCT Filed: Nov. 2, 2021

(86) PCT No.: PCT/IB2021/060136
§ 371 (c)(1),
(2) Date: May 2, 2023

(87) PCT Pub. No.: WO2022/091071
PCT Pub. Date: May 5, 2022

(65) Prior Publication Data

US 2023/0400571 A1 Dec. 14, 2023

Related U.S. Application Data

(60) Provisional application No. 63/108,477, filed on Nov. 2, 2020.

(51) Int. Cl.
*G01S 15/89* (2006.01)

(52) U.S. Cl.
CPC .................................... *G01S 15/89* (2013.01)

(58) Field of Classification Search
None
See application file for complete search history.

(56) References Cited

U.S. PATENT DOCUMENTS 3,534,326 A * 10/1970 Glenn, Jr. ........... G01S 15/8968 385/116
4,173,008 A * 10/1979 Keith ........................ G01S 5/20 367/122
4,198,702 A * 4/1980 Clifford .................. G01S 7/529 367/106
4,445,186 A * 4/1984 Caron ..................... G01S 15/89 345/559
4,475,400 A * 10/1984 Flax ....................... G01N 29/40 73/631
4,660,565 A * 4/1987 Shirasaka ........... G01S 15/8979 600/455
4,694,296 A * 9/1987 Sasaki .................... G08G 1/166 340/904
5,303,204 A * 4/1994 Wertsberger ............ G01S 15/93 367/909

(Continued)

*Primary Examiner* — Jonathan D Armstrong
(74) *Attorney, Agent, or Firm* — Rivka Friedman

(57) ABSTRACT

A method and system for mapping an environment with acoustic signals, the method including: listening to the environment with an acoustic sensor; randomly selecting a frequency; generating an acoustic signal at the frequency; transmitting the generated acoustic signal; receiving, at the acoustic sensor, a feedback signal formed from the acoustic signal rebounding off an object in the environment; processing the feedback signal to determine a distance to the object; repeating the method to generate a map of the environment.

14 Claims, 6 Drawing Sheets

(56) References Cited

U.S. PATENT DOCUMENTS

| | | | | | |
|---|---|---|---|---|---|
| 5,867,800 | A * | 2/1999 | Leif | G01S 15/874 | 342/132 |
| 9,300,581 | B1 * | 3/2016 | Hui | H04W 72/56 | |
| 9,689,958 | B1 * | 6/2017 | Wild | G01S 1/751 | |
| 9,693,169 | B1 * | 6/2017 | Carlsson | G01S 15/89 | |
| 10,753,906 | B2 * | 8/2020 | Oh | G06F 3/14 | |
| 2002/0151767 | A1 * | 10/2002 | Sonnenschein | A61B 1/00181 | 600/117 |
| 2004/0035208 | A1 * | 2/2004 | Diaz | G01N 29/326 | 702/56 |
| 2007/0038448 | A1 * | 2/2007 | Sherony | G06F 16/65 | 704/E11.001 |
| 2010/0278008 | A1 * | 11/2010 | Ammar | G01S 7/521 | 367/87 |
| 2011/0182445 | A1 * | 7/2011 | Atsmon | G06F 21/35 | 381/123 |
| 2012/0155305 | A1 * | 6/2012 | Park | H04W 64/00 | 370/252 |
| 2014/0269193 | A1 * | 9/2014 | Junkar | G01S 5/18 | 367/99 |
| 2015/0094952 | A1 * | 4/2015 | Moeglein | G01S 19/14 | 701/532 |
| 2016/0226761 | A1 * | 8/2016 | Hui | H04L 61/5014 | |
| 2016/0254795 | A1 * | 9/2016 | Ballard | H04N 21/4398 | 381/107 |
| 2017/0005531 | A1 * | 1/2017 | Zeine | H04W 56/0035 | |
| 2018/0038954 | A1 * | 2/2018 | Deshpande | G01S 15/523 | |
| 2019/0293609 | A1 * | 9/2019 | Oh | G01S 15/89 | |
| 2019/0310366 | A1 * | 10/2019 | Sipko | G01S 15/89 | |
| 2022/0326377 | A1 * | 10/2022 | Meijer | G01S 7/527 | |
| 2022/0390599 | A1 * | 12/2022 | Fan | H04R 1/08 | |
| 2024/0099685 | A1 * | 3/2024 | Sivan | G10L 21/043 | |

* cited by examiner

HIGH-LEVEL MAPPING PROCESS

COMMUNICATIONS TECHNOLOGY SELECTION MANAGEMENT AND MAPPING ALGORITHM

FIELD OF THE INVENTION

The present invention relates to a mapping technologies and specifically to a system and method for acousically mapping an environment and selecting and managing multiple communications technologies to communicate in the mapped environment

BACKGROUND OF THE INVENTION

The acoustic sensors market was valued at USD 707.94 million in 2019 and is expected to reach USD 1750.19 billion by 2025, at a CAGR of 14% over the forecast period 2020-2025. The use of acoustic sensors for acoustic-wave-based MEMS devices has created a promising technology platform that is available for a wide range of applications. These devices have high sensitivity and can operate wirelessly.

The surface wave (SAW) acoustic sensor is expected to have high growth during the forecast period due to their implementation in television transmitters and radios to generate signals for broadcasting. In fact, SAW devices are indispensable as filters in radio frequency applications and are important components used in the terminals and base stations for satellite communication.

Moreover, automotive applications have marked a significant demand for acoustic sensors recently. The complete silence of the motors used in electric cars may pose a hazard to inattentive pedestrians. As a result, the new electric and hybrid vehicles will have to be equipped with an acoustic warning system. Therefore, rising concerns regarding traffic management will drive the market growth.

The telecommunications industry is the largest consumer of acoustic sensors, primarily driven by smartphones and base stations. With telecom companies setting up more and more towers to support the ever-increasing customer base, base stations are increasing.

Moreover, people, especially in developing countries, are buying smartphones owing to the increase in disposable incomes and low-budget smartphones. In fact, according to a Cisco VNI Mobile report published in 2019, there will be significant growth of smartphones (including phablets) from 50 percent share of total devices and connections in 2017 to over 50 percent (54 percent) by 2022.

SUMMARY OF THE INVENTION

It is desirable to minimize power consumption in electronic devices.

It is desirable to map an area, in particular an indoor area where GPS and other signals may not be useable.

According to the present invention there is provided a method and system for mapping an environment with acoustic signals, the method including: listening to the environment with an acoustic sensor; randomly selecting a frequency; generating an acoustic signal at the frequency; transmitting the generated acoustic signal; receiving, at the acoustic sensor, a feedback signal formed from the acoustic signal rebounding off an object in the environment; processing the feedback signal to determine a distance to the object; repeating the method to generate a map of the environment.

According to further features in preferred embodiments of the invention described below wherein the processing further determines a direction to the object based on the reception at the acoustic sensor of the feedback signal.

According to still further features in the described preferred embodiments the processing further determines what the object is based on a rebound frequency of the feedback signal. According to further features the rebound frequency is compared to frequencies listed in a table of frequencies wherein each of the frequencies is correlated to an identified object or noise in the table.

According to further features the method and system further include a step of preprocessing the feedback signal, wherein the preprocessing step includes de-noising the feedback signal.

According to further features the method and system further include a step of preprocessing the feedback signal, wherein the preprocessing step includes an amplification of the feedback signal.

According to further features the processing of the feedback signal to determine the distance includes calculating a Doppler effect.

According to further features the processing of the feedback signal to determine the distance includes calculating a Time Difference Of Arrival (TDOA).

According to further features the processing of the feedback signal to determine the distance includes calculating a dynamic range of the signal length.

According to further features the method and system further include a step of selecting one communications technology medium from a group of available communications technology media, the selected communications technology medium communicating outside of the environment via the object.

According to further features the object is an external communications device, and the selected communications technology medium employs a same communications technology as the external communications device.

According to further features the object emits an object frequency and the selected communications technology medium emits a communications signal in a frequency range corresponding to the object frequency. According to further features the communications signal is converted to the object frequency to facilitate communication outside of the environment via the object.

According to further features the method and system further include shutting down each medium of the group of available communications technology media which is not in use.

According to further features the method and system further include boosting energy to the selected communications technology to extend an effective communications range of the selected communications technology.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a device, process and algorithm for selecting and managing communications technology as well as a mapping algorithm for mapping an environment based on soundwaves according to the present invention may be better understood with reference to the drawings and the accompanying description.

Selection of Communications Technology

Figure 1:
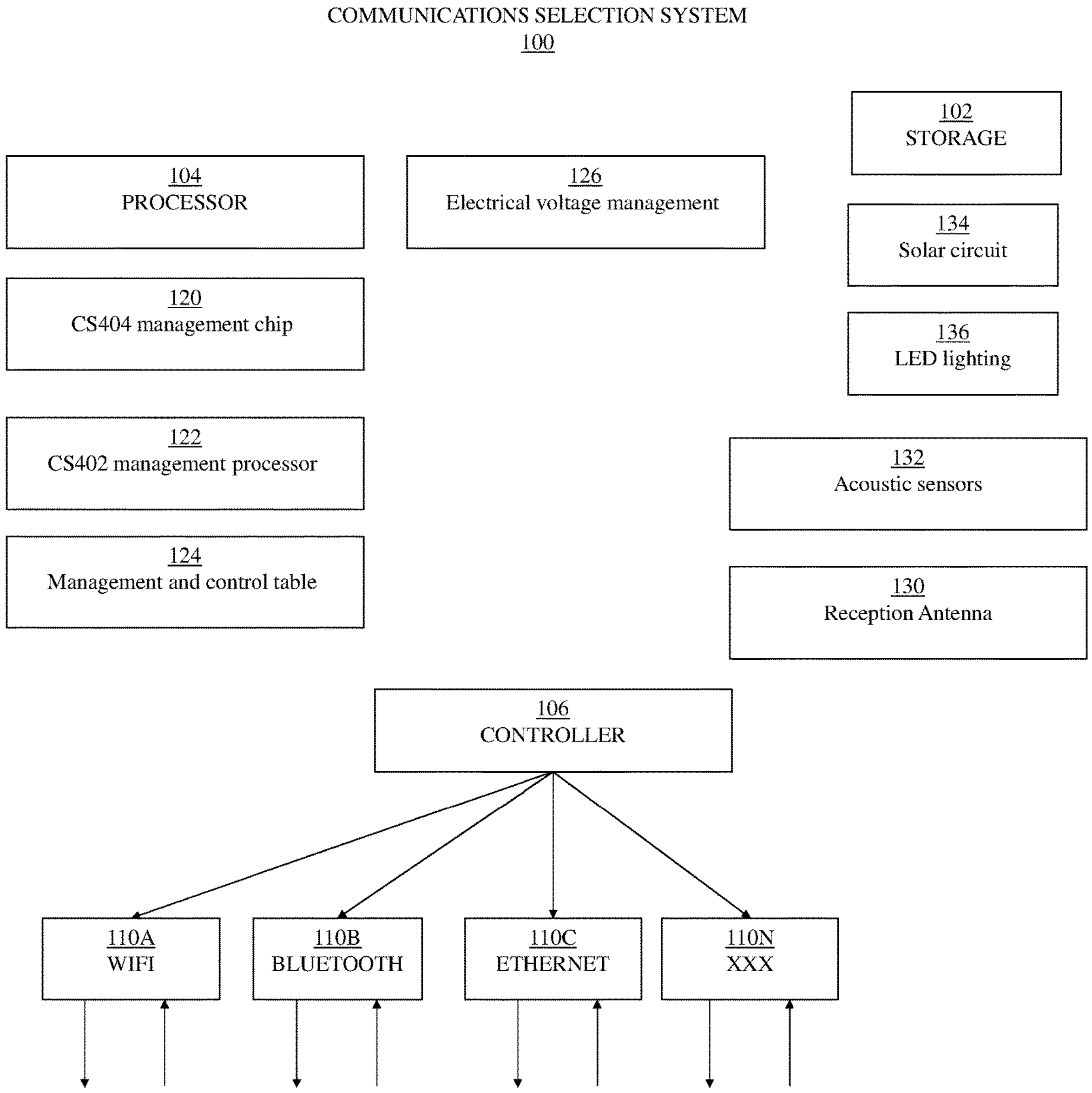
FIG. 1 is a block diagram of a system for selecting one technology medium from an array of available communications technologies media.

FIG. 1 illustrates a block diagram of a system 100 for selecting one technology medium from an array of available communications technologies media. The communications selection system 100 includes various hardware components. The system may further include additional component, however, only components germane to the innovation and/or the description thereof have been depicted. Likewise, some of the components that are not essential for the understanding of the innovative aspects of the system may be missing from various configurations of the system. Accordingly, the presented system is merely exemplary, intended to convey an adequate description of the innovative aspects of an embodiment of the innovation.

The depicted innovative system 100 includes a processor 102 and a storage component 104. Furthermore, the system includes a controller 106. The controller controls various aspects of the system. The controller is depicted in communication with various communications components/media such as WiFi 110A, BlueTooth 110B, Ethernet 110C, and more (indicated by block XXX 110N).

The system includes a management chip 120 (e.g., the CS404 management chip which is a unique chip developed by the current inventor) that can communicate with all the aforementioned technologies, as well as many more communications technologies. A management processor 122 is provided for the system, such as the CS402 management processor which is a unique chip developed by the current inventor. The management processor, for example, controls activation and deactivation of the various communication technology media (depending on which medium is being used at the time and which media are not being used). The system further includes a management and control table 124 for, inter alia, managing and controlling the program flow of the end communications media units.

An electrical voltage management module 126 is provided for activating and deactivating any of the media units in the system. One or more reception antennas 130 receive wireless signals in different frequency ranges. One or more acoustic sensors 132 listen to the environment. A solar circuit 134 provides a constant voltage without the need for external intervention. LED lighting 136 is provided on the unit. The solar circuit may be replaced by a rechargeable battery or may have such a battery as a backup in case the solar circuit does not have sufficient power.

Alternatively, or additionally, the device may receive power from a 'parent' device such as a cellphone that houses the instant system, e.g., when the system is embodied on a chip (e.g., a system-on-chip SoC). In a similar fashion, the instant system may be integrated with a larger device and use/share some of the sub-systems of the larger device (e.g., the processor, storage, etc.) so that the device or chip, can be further miniaturized and/or space and resources can more efficiently be used or shared. To this end, the system/device 100 may be configured to utilize the native communications technologies that already exist in the parent device (such as cellular communications, WIFI, BT etc.). Such a configuration further reduces the need for the chip to include already available technology modules and antennas.

Figure 2:
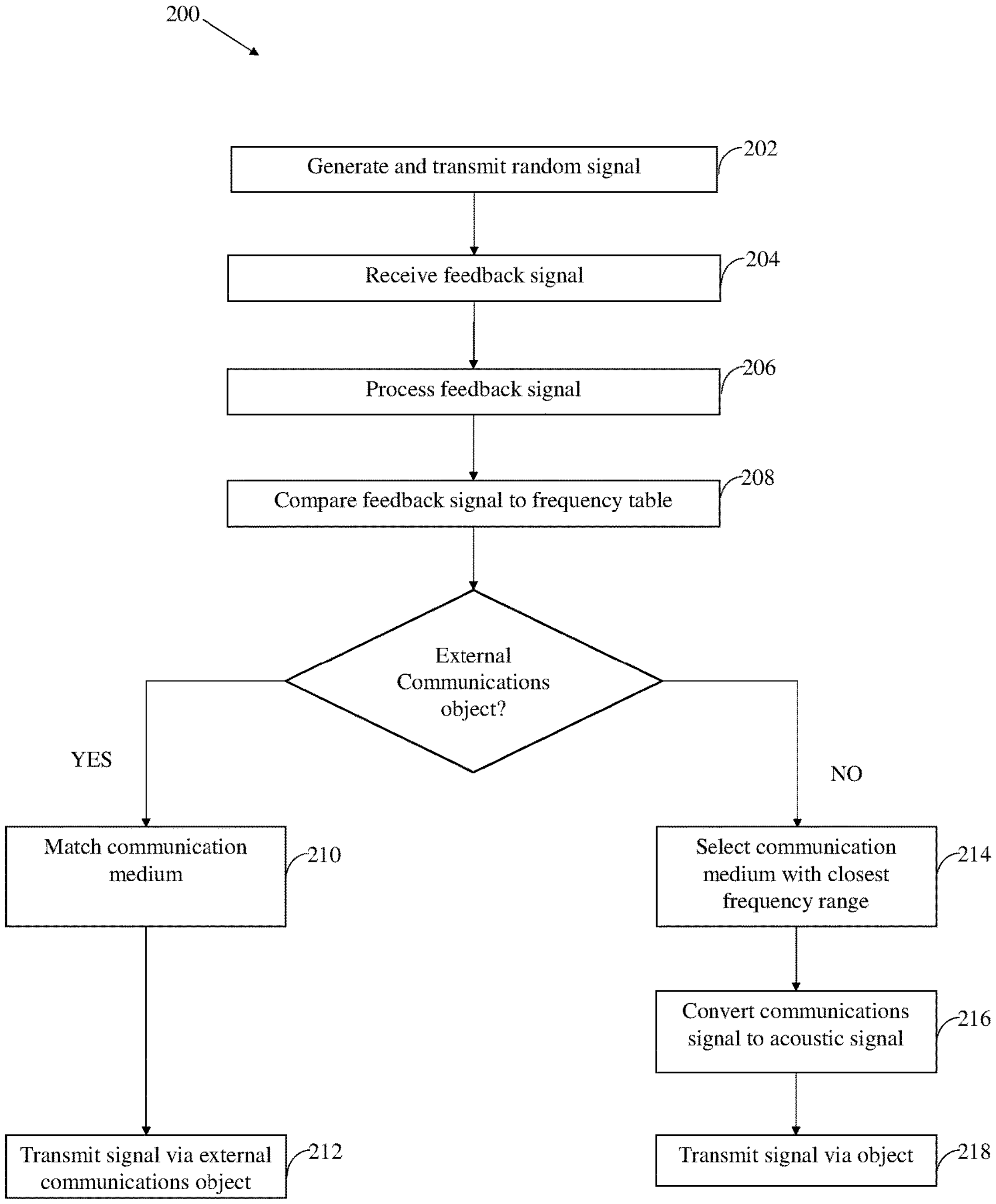
FIG. 2 is a flowchart of a method for selecting a communications technology medium.

FIG. 2 is a flowchart of a method for selecting a communications technology medium. When the device is in an environment that does not allow the communication via regular communication means (WIFI, cellular, BT, etc.), the system listens to the environment to acoustically detect some object that can serve as a communications conduit to connect with an area outside the present, restrictive environment. The system is capable of converting these objects or conduits into antennas that transmit and receive via communications technologies that are available on the device. For example, a power line emits a sound at a given frequency. The acoustic sensor (e.g., a microphone) 'hears' this sound and selects a communications medium that will send a signal that has been converted to match the frequency of the conduit, in this case the power line. Effectively, the power line is now a conduit or antenna from transmitting (and receiving) communications that one of the onboard communication media can translate and understand.

For example, the following formula can be used to convert or translate the frequency to a communications medium signal and vice versa.

$$P_{echo} \sim \frac{P_{call} G_{tr} A_{ear} \sigma \exp(-2\alpha R)}{R^4} \quad (1)$$

Where:

$P_{echo}$=Power of echo that gets to the object $P_{call}$=Power of sonar feedback signal produced by the signal rebounding off the object R=target range $G_{tr}$=Gain of transmitting antenna (mic or spk)

$A_{ear}$=Area of receiving antenna (i.e., the size of the range)=

λ=Wavelength σ=Sonar cross section α=Atmospheric attenuation constant

The management processor uses an algorithm to select the best frequency based on for example: (1) power needed to produce the signal; (2) range of the signal; and least noisy frequency. Once a frequency has been isolated for use, the system needs to select a medium to generate the signal which will ride on the conduit (i.e., the object emitting the isolated frequency). The system selects the specific medium based on having the closest corresponding aspects to the isolated frequency.

The target object may even be a corresponding communications technology itself (e.g., in a tunnel there will be no WIFI, BT, radio frequencies, GPS, but there may be a RFID device which the system will lock onto and task the onboard RFID medium to communicate the RFID target object). The instant technology selection algorithm knows how to bounce between multiple different technologies to see if any corresponding devices are in range and how far away each responding device is. Examples of communications technologies include, but are not limited to: RF (radio frequency)/RFID (radio frequency identification)/BLE (Bluetooth Low Energy)/GPS (Global Positioning Satellite)/GPRS (General Packet Radio Service)/CELL (cellular data)/WIFI/SENSOR/IOT (Internet of Things)/ACOUSTIC/HIGH FREQ (high frequency).

Method 200 for determining a frequency of an object in an environment. The method starts at block 202 where a signal is randomly generated on the selected technology. Actually, many signals are generated either at the same time or successively (this can be understood as repeating the processes of sending a single signal, etc., multiple times, where the multiple times can happen successively or simultaneously). The signals rebound off objects in the environment. The rebound or feedback signal is received by the acoustic sensor(s) at block 204. The feedback signal is processed at step 206 to extract an object frequency that the object emits.

This frequency is compared, at block 208, to a table of frequencies that correspond to objects. This table may be pre-populated with known objects and frequencies and/or may be continually populated/updated as the system learns the frequencies of more and more objects.

The objects may be a rock, leaves, a telephone pole, a cellular base station, or in fact any object. For the purposes of this document, the objects are divided into regular objects and external communications objects. For example, a power line is a regular object, whereas a cellular base station (e.g., of a telcom company that does not provide service to the user's cellular device) is considered an external communications object.

If the object is an external communications object then, at block 210 the algorithm matches the type of communications medium and sends a signal from that technology medium (e.g., a WIFI signal to a WIFI router or a cellular signal to a cellular base station [regardless of what data/content the base station traffics, here the signal that will be sent is merely piggybacking on the technology/antenna]) outside of the environment via the external communications object, at block 212.

If there are multiple devices or objects then the nearest and/or least power consuming object is selected. The signal is acknowledged by the detected, nearest device of the same technology. For example, a WIFI signal that is sent from the system 100 is received by a nearby router which sends back a signal identifying itself. Distance between user device 100 and the responding device can be calculated in real-time (e.g., using Received Signal Strength Indicator (RSSI) values to calculate distance).

In the case of a regular object, which does not have an exactly corresponding communications technology, the algorithm needs to determine, at block 214, which communication medium is the best to be used with the object (e.g., power lines, discussed above). The algorithm/system has a table of frequencies of all the onboard technology media units. The algorithm matches frequency to the best medium using this table.

Initially, the algorithm determines which group of frequencies, high, medium or low the captured sound belongs to. The algorithm also determines (calculates) what type of object is emitting the frequency. For example, the algorithm tries to determine if the object is a stationary type of object (rock, wall, etc.) or a moving object (car, leaves, etc.). The lookup table is used to make or help make this determination. The system, to a certain degree, mimics the echolocation (bio-sonar) technique in bats, by which the bats detect the environment around them and even identify the environment around them. Exemplarily, the instant system divides sounds into 256 layers and each layer has 85 bandwidths. The sounds are catalogued or divided according to the system's internal layers and bandwidth.

At block 216, the communications medium signal is converted into an acoustic signal, e.g., as described above.

At block 218, the system transmits the converted signal via the object, which is now a conduit or antenna for this communication.

The algorithm activates each medium and tests the distance/power output needed. The algorithm deactivates the medium that is not relevant and sends a command to run the relevant technology. Deactivating communication components that are not being used can save more than 65% of battery energy.

The next step is to use the above-described process when moving in space. The mapping process is ongoing, detecting, measuring distance, direction, processing, building a rolling map of the environment.

The system performs time delay (or other) calculations and sends information in a manner that maximizes energy efficiency and technology use. When there are many frequencies in the environment, the algorithm maps the new environment in the most energy efficient manner and turns on technologies that are in use and turns off technologies that are not in use at that moment.

There are two processes that run simultaneously: one calculates the random response speed of the algorithm, and the other calculates the need to amplify the signal vis-à-vis the base position and distance of the sensor from that base position.

The algorithm will always look for a frequency and a corresponding communications medium (the best technology for the frequency) to transmit the information about the location of the sensor. For example, the device can seek a high-power line or high frequency emitter and turn it into a transmission conduit thereby modifying information regarding the location of the sensor/device.

Figure 3:
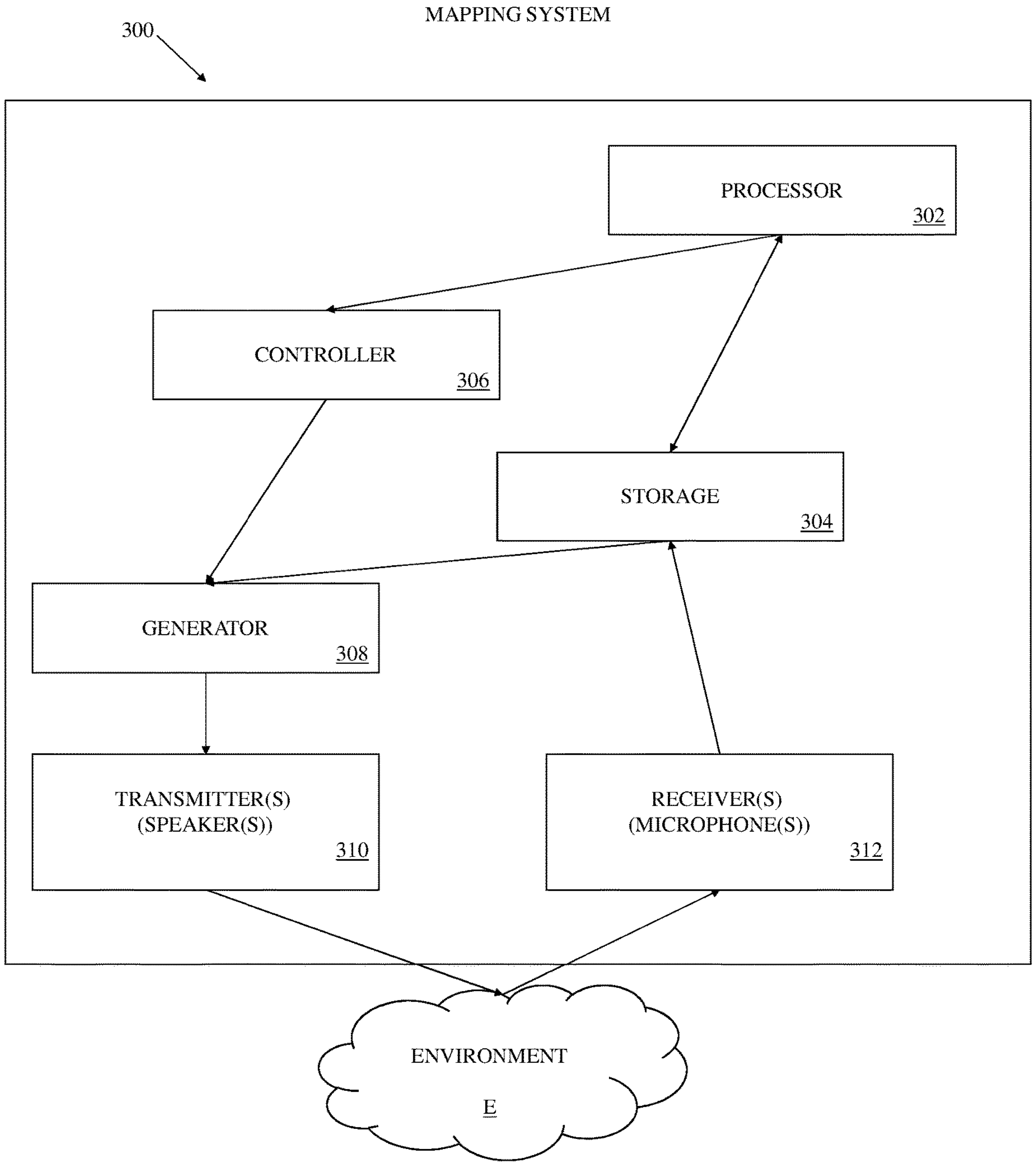
FIG. 3 is a diagram of a system for acoustically mapping the environment.

FIG. 3 is a diagram of a system for acoustically mapping the environment. The system performs object detection based on the acoustics emitted by the object or by soundwaves bouncing off the object.

Mapping system 300 includes a processor 302, a storage component 304 and a controller 306. The system further has an acoustic signal generator 308, a transmitter 310 and a receiver 312. The transmitter may be, for example, a speaker and the receiver may be, for example, a microphone. The transmitter transmits the signal to an immediate environment E and the receiver receives feedback from the environment E.

Figure 4:
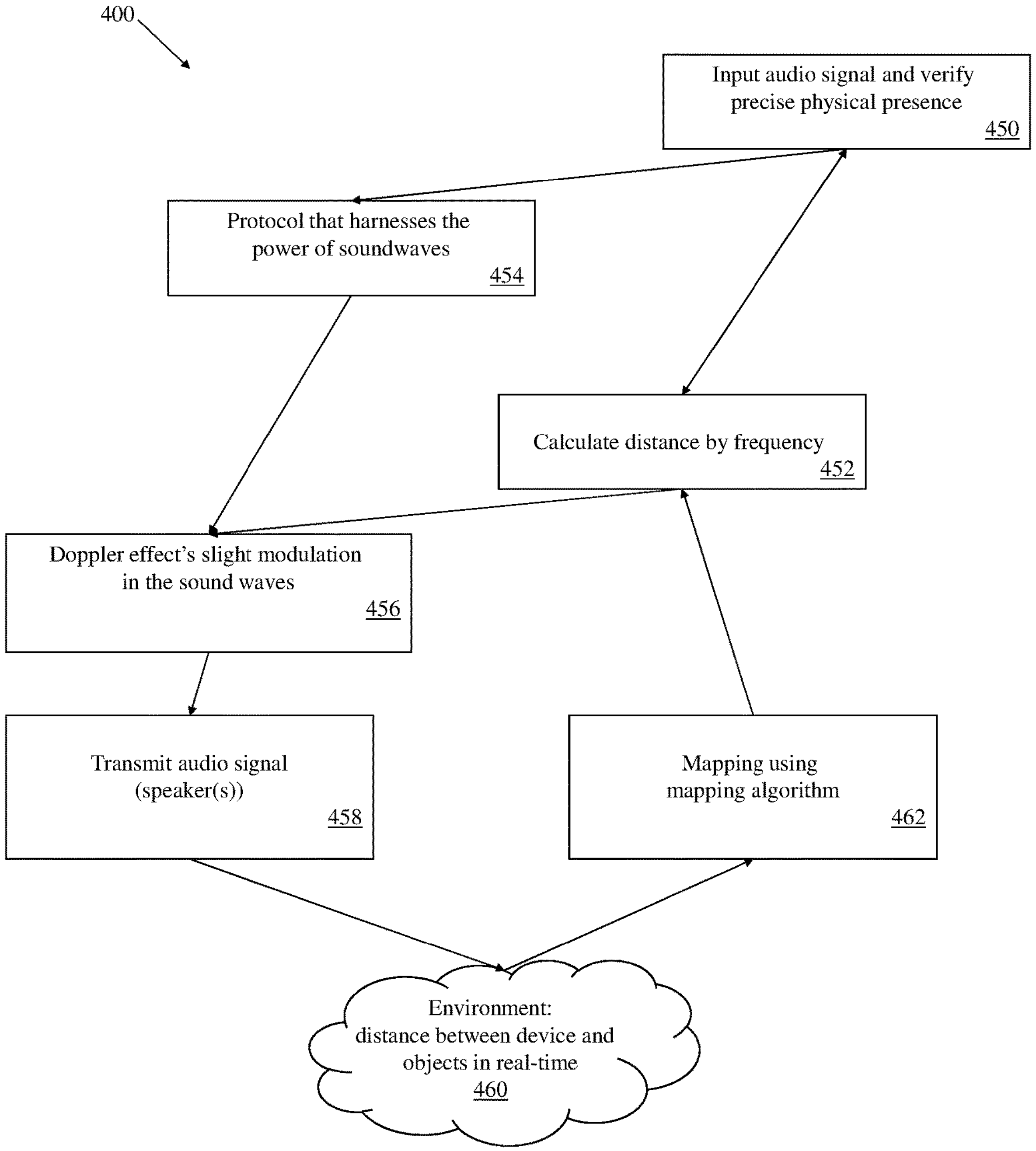
FIG. 4 is a high-level flowchart of a mapping algorithm.

FIG. 4 is a high-level flowchart 400 of a mapping algorithm. Input block 450 is an audio signal used to verify precise physical location. Block 452 calculates distance between the instant device and the receiving object based on the frequency of the generated audio signal 450. At block 462 the mapping algorithm calculates a map of the immediate environment.

Block 454 is a protocol that harnesses the power of soundwaves. With so many signals being received at the device, a great deal of energy can be stored up. The energy can be used by the system, thereby improving the power management aspects of the system. Block 456 is Doppler effect's slight modulation in the sound waves. Because sensing changes in the Doppler frequency is so important, it is worth reviewing the reason for adjusting the Doppler frequency. A common example everyone has experienced is standing near a railroad or highway. As a train or truck approaches, one can hear a sound in a certain frequency. When the train or truck passes, the sound immediately drops by a few octaves. This change in the frequency is caused by the Doppler effect. Although we cannot feel it, the light waves are affected in the same way as the sound waves. In fact, the understanding that our universe is expanding was determined by making very subtle Doppler measurements of starlight in the night sky.

In a radar system the frequency is changed by the process of returning from a moving object. Consider the transmission of a sinusoidal wave. The distance from the summit of each wave to another is the wavelength, which is inversely proportional to the frequency. The next wave peak returned has a shorter distance traveling back and forth, from the radar to the target and back to the radar. This is because the target is closer in the time interval between the previous and current wave peak. Because the frequency is inversely proportional to the length of the wave, the frequency of the sinusoidal wave appears to have increased. Absorption lengthens, resulting in longer (larger) wavelength and lower frequency. This effect becomes more pronounced when the frequency of the transmitted sinusoid is high (short wavelength). Accordingly, the effect of shortening or lengthening the wavelength because of the Doppler effect is more pronounced. Therefore, Doppler frequency changes are more easily detected when using higher frequency waves, since the percentage change in frequency will be greater.

Another method for calculating distance is by measuring a dynamic range of sound intensity. For example, a dynamic range (for echo sound intensity) can be found where an acoustic signal transmitted at 135 dB. The acoustic sensor can detect echoes (rebounding feedback signal) from ~0 dB SPL (20 μPa) up to perfectly-reflected echoes of the original transmission acoustic signal, which has an emitted power of 135 dB SPL At Block 458 the audio signal is transmitted. Block 460 represents the environment, including distances between the device and the objects, in real time. At Block 462 the mapping algorithm processes the audio signals received from the environment.

Noise Prevention Algorithm

The signal received by microphones is mixed with noise when there is noise interference. The noises that the acoustic sensor deals with consist of the body noises of the object as well as environmental noises that change in different work scenarios, and the like. Incoming body noises and ambient noises include air conditioning noises and certain types of weak external noises (car engine noises, wind blowing noises, etc.). These noises can be considered as short-sighted stable plug-in noise. Spectral subtraction methods and average normalization methods are applied to remove such noise.

By estimating the noise level in each frame and subtracting from the overall power spectrum, the spectral subtraction method can estimate the pure audio power spectrum, while the stage of a clean speech frame is replaced by the stage of loud speech. Cepstral mean normalization is also applied to the noise prevention algorithm, inter alia, to eliminate the cepstral bias caused by convulsive noise. Moreover, it can also handle background noise additives to some extent.

Figure 5:
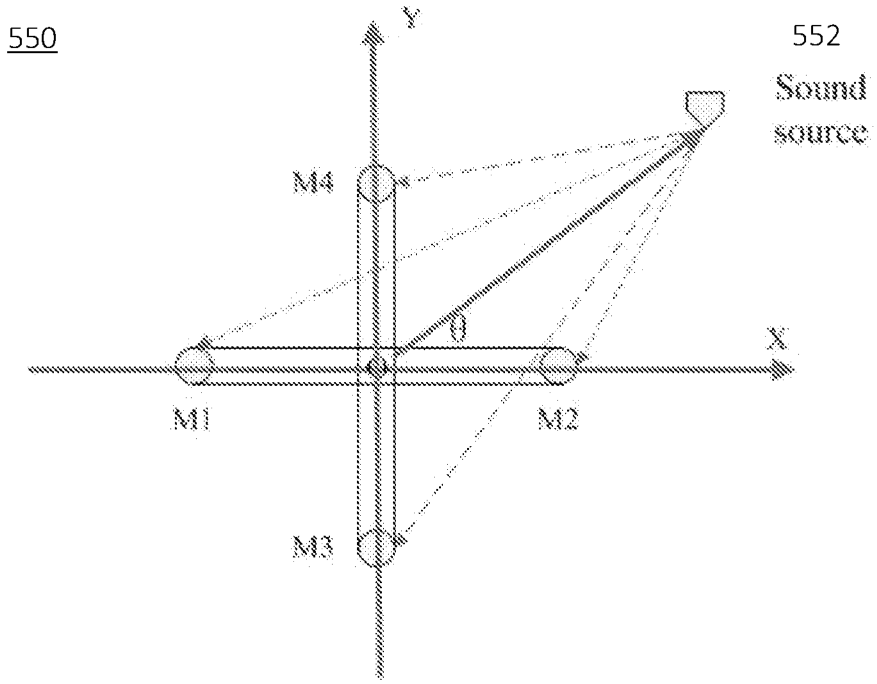
FIG. 5 is a diagram of a time inversion algorithm.

FIG. 5 illustrates a diagram 550 of a time inversion algorithm. Listening to the environment by acoustic sensors and microphones. The algorithm functions to detect acoustic artifacts of a sharp noise source in a complex environment.

M1 denotes a microphone that listens to certain low frequencies. M2 marks the distance between the low frequency acoustic return. M3 denotes calculation of both microphones simultaneously and calculation of tracking. M4 indicates high frequency listening. X indicates an acoustic return from a wall or object and a transition to a management table. Y indicates an acoustic return at a height sensor.

Calculation of the above elements gives a picture of an initial mapping of the device's location within the environment and checks with the table whether these frequencies are known (such as the sound of a door at one frequency or the sound of a window at another and so on). Modeling sound propagation in which the sensors pick up the event. The sources of sound waves 552 are realized in the computational model, and the focus of the intersection of the waves indicates the true source.

The instant system can be embodied in a small device for identifying the direction of a spatial sound source. Three or more acoustic-electric transducers are regularly arranged on the circuit board in a centrosymmetric distribution. The distance between adjacent acoustic-electric transducers does not exceed half the shortest wavelength of the sound source signal. The device includes a corresponding number of microcontroller units. Each acoustic-electric transducer is electrically connected to a respective microcontroller unit. The microcontroller unit obtains the directional information regarding the spatial sound source based on the acoustic signals collected by three or more MEMS (micro-electro-mechanical system) acoustic-electric transducers. The present invention also provides a method of identifying the orientation of a spatial sound source. The device of the orientation of the small spatial sound source of the present invention has an extremely small area size, and can accurately identify the directional information of the sound source.

The technologies for the spatial detection (direct and distance) of a sound source based on an array of microphones can be classified into three classes: (1) directional technology based on high-resolution spectral estimation; (2) controllable beam generation technology based on the largest output power; and (3) technology based on arrival delay time (TDOA).

The first method is usually aimed at narrowband signals, but sound signals are broadband signals that need to improve positioning accuracy with high computational complexity. The second method requires a priori knowledge of sound source and environmental noise, and for which the computational complexity is also high. Finally, the TDOA method is a powerful tool for attaining real time data and is suitable for finding the location of a single speech/sound source. Better positioning accuracy can be achieved by using appropriate enhancements to overcome noise and resonance artifacts/contamination (e.g., de-noising, cepstral average mean normalization, etc.).

Figure 6:
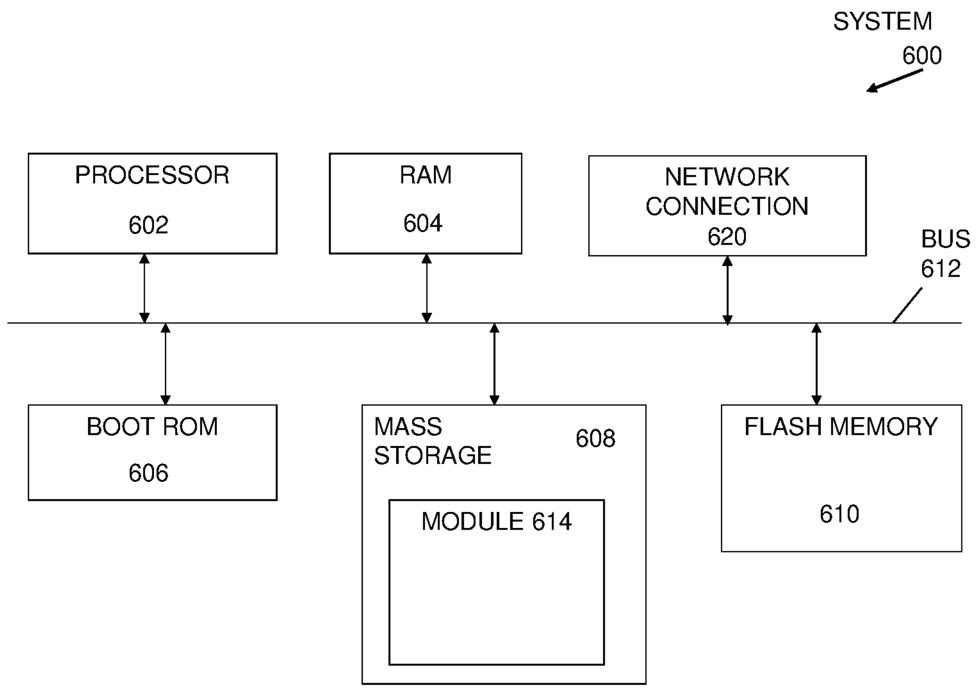
FIG. 6 is a high-level partial block diagram of an exemplary system.

FIG. 6 is a high-level partial block diagram of an exemplary system 600 configured to implement the system 100 of the present invention. Corresponding components are interchangeable. System (processing system) 600 includes a processor 602 (one or more) and four exemplary memory devices: a RAM 604, a boot ROM 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element (s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a non-transitory computer-readable storage medium bearing computer-readable code for implementing the data storage methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks. System 600 can be implemented as a server or client respectively connected through a network to a client or server.

The mapping system works in many layers to identify the last time there was communication (e.g., GPS, WIFI, cellular, etc.) and once no longer in communication with these location-based technologies, the algorithm draws an internal map using acoustic frequencies, as discussed above, to determine location and search for a way to break into external communications as needed.

In summary, the system and method employs a location recognition algorithm by listening to the environment. The system uses unique technology with multiple topologies/layers and protocols. The algorithm can be implemented in cellular devices and manages the communication of the device by disconnecting and connecting various communication media. The device listens to the environment and randomly sends a signal through a speaker of the device that hits an object such as a wall or door, etc. and hears or receives an echo (feedback signal) back through the device's microphone.

The algorithm requests/monitors the signal strength to give a distance between the device and the object. The process mimics the similar phenomenon by which a bat operates and provides accurate location even in buildings without GPS/WIFI/BT/RF reception and other various detection and communication technologies.

The system locates a sound source based on a high-sensitivity microphone capable of receiving a range of frequencies in the audible and inaudible ranges of humans. The system converts the signal into a frequency that can be piggy-backed on, in order to transmit information back and forth. Various challenges such as uncertainty of the movement, noise and reverberation, the requirements of a compact microphone array and so on are addressed by the instant system and process. The system provides capabilities for the location of sound sources in a dynamic environment, learning new sound sources and creating a dynamic map to give an exact location.

Some applications of the system may include:

1. A system for detecting blood alcohol level based on different voice frequencies caused by alcohol consumption. The application disables the vehicle until the driver passes a more comprehensive test (e.g., a personal breathalyzer testing unit in communication with the onboard computer system of the car.

2. A system to identify and/or locate lost luggage worldwide. A device attached to the luggage can map the local environment and then piggy-back on communications hubs in the environment to send a signal with the location information back to the user or local authorities.

4. Finding a car in a parking lot, e.g., by acoustically mapping the route initially taken from the vehicle.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for mapping an environment with acoustic signals, the method comprising:

listening to the environment with an acoustic sensor;

randomly selecting a frequency;

generating an acoustic signal at said frequency;

transmitting said generated acoustic signal;

receiving, at said acoustic sensor, a feedback signal formed from said acoustic signal rebounding off an object in the environment;

processing said feedback signal to determine a distance to said object and an object frequency that the object emits;

repeating the method to generate a map of the environment; and selecting one communications technology medium from a group of available communications technology media, said selected communications technology medium communicating outside of the environment via said object identified through acoustic mapping based on the feedback signal, by converting the object into an antenna that transmits and receives via the selected communications technology medium.

2. The method of claim 1, wherein said processing further determines a direction to said object based on said reception at said acoustic sensor of said feedback signal.

3. The method of claim 1, wherein said processing further determines what said object is based on a rebound frequency of said feedback signal.

4. The method of claim 3, wherein said rebound frequency is compared to frequencies listed in a table of frequencies wherein each of said frequencies is correlated to an identified object or noise in said table.

5. The method of claim 1, further including a step of preprocessing said feedback signal, wherein said preprocessing step includes de-noising said feedback signal.

6. The method of claim 1, further including a step of preprocessing said feedback signal, wherein said preprocessing step includes an amplification of said feedback signal.

7. The method of claim 1, wherein said processing of said feedback signal to determine said distance includes calculating a Doppler effect.

8. The method of claim 1, wherein said processing of said feedback signal to determine said distance includes calculating a Time Difference Of Arrival (TDOA).

9. The method of claim 1, wherein said processing of said feedback signal to determine said distance includes calculating a dynamic range of the signal length.

10. The method of claim 1, wherein said object is an external communications device, and said selected communications technology medium employs a same communications technology as said external communications device.

11. The method of claim 1, wherein said object emits an object frequency and said selected communications technology medium emits a communications signal in a frequency range corresponding to said object frequency.

12. The method of claim 11, wherein said communications signal is converted to said object frequency to facilitate communication outside of the environment via said object.

13. The method of claim 1, further comprising shutting down each medium of said group of available communications technology media which is not in use.

14. The method of claim 1, further comprising boosting energy to said selected communications technology to extend an effective communications range of said selected communications technology.

* * * * *